United States Patent
Strijker et al.

(10) Patent No.: US 7,304,870 B2
(45) Date of Patent: Dec. 4, 2007

(54) POWER CONVERTER

(75) Inventors: Joan Wichard Strijker, Nijmegen (NL); Antonius Maria Gerardus Mobers, Nijmegen (NL); Arnold Benedictus Van Der Wal, Nijmegen (NL)

(73) Assignee: NXP B.V., Eindhoven (NL)

( * ) Notice: Subject to any disclaimer, the term of this patent is extended or adjusted under 35 U.S.C. 154(b) by 123 days.

(21) Appl. No.: 10/534,276

(22) PCT Filed: Oct. 10, 2003

(86) PCT No.: PCT/IB03/04558

§ 371 (c)(1),
(2), (4) Date: May 6, 2005

(87) PCT Pub. No.: WO2004/042905

PCT Pub. Date: May 21, 2004

(65) Prior Publication Data

US 2006/0109691 A1    May 25, 2006

(30) Foreign Application Priority Data

Nov. 7, 2002   (EP)   .................... 02079678

(51) Int. Cl.
*H02H 7/122*   (2006.01)

(52) U.S. Cl. .................................................. 363/56.11
(58) Field of Classification Search ............. 363/56.11, 363/21.12, 56.09
See application file for complete search history.

(56) References Cited

U.S. PATENT DOCUMENTS

| | | | | |
|---|---|---|---|---|
| 4,559,591 A | * | 12/1985 | Grunsch ................... | 363/21.09 |
| 4,939,632 A | * | 7/1990 | Plagge et al. ................. | 363/19 |
| 4,996,638 A | * | 2/1991 | Orr ......................... | 363/21.15 |
| 5,103,386 A | | 4/1992 | Herrmann | |
| 6,016,260 A | * | 1/2000 | Heeringa .................. | 363/21.18 |
| 6,191,959 B1 | * | 2/2001 | Miermans ................. | 363/21.15 |

* cited by examiner

*Primary Examiner*—Shawn Riley

(57) ABSTRACT

A power converter comprises an inductor (L) and a main switch (M1) having a main current path, the inductor (L) and the main current path are arranged in series to receive a DC-input voltage (VIN). A control circuit (CC) controls on-periods (Ton) and/or off-periods (Toff) of the main switch (M1) to stabilize an output voltage (VO) supplied to a load (LO). The control circuit (CC) further has an input (IN) to receive a measuring signal (MS) to protect the main switch (M1) against situations of overvoltage. A measuring circuit (MC) is coupled to a junction (J1) of the inductor (L) and the main current path to obtain the measuring signal (MS) which is indicative of a voltage across the main current path. Preferably, the measuring circuit (MC) comprises a peak-clamp.

11 Claims, 2 Drawing Sheets

Figure 1:
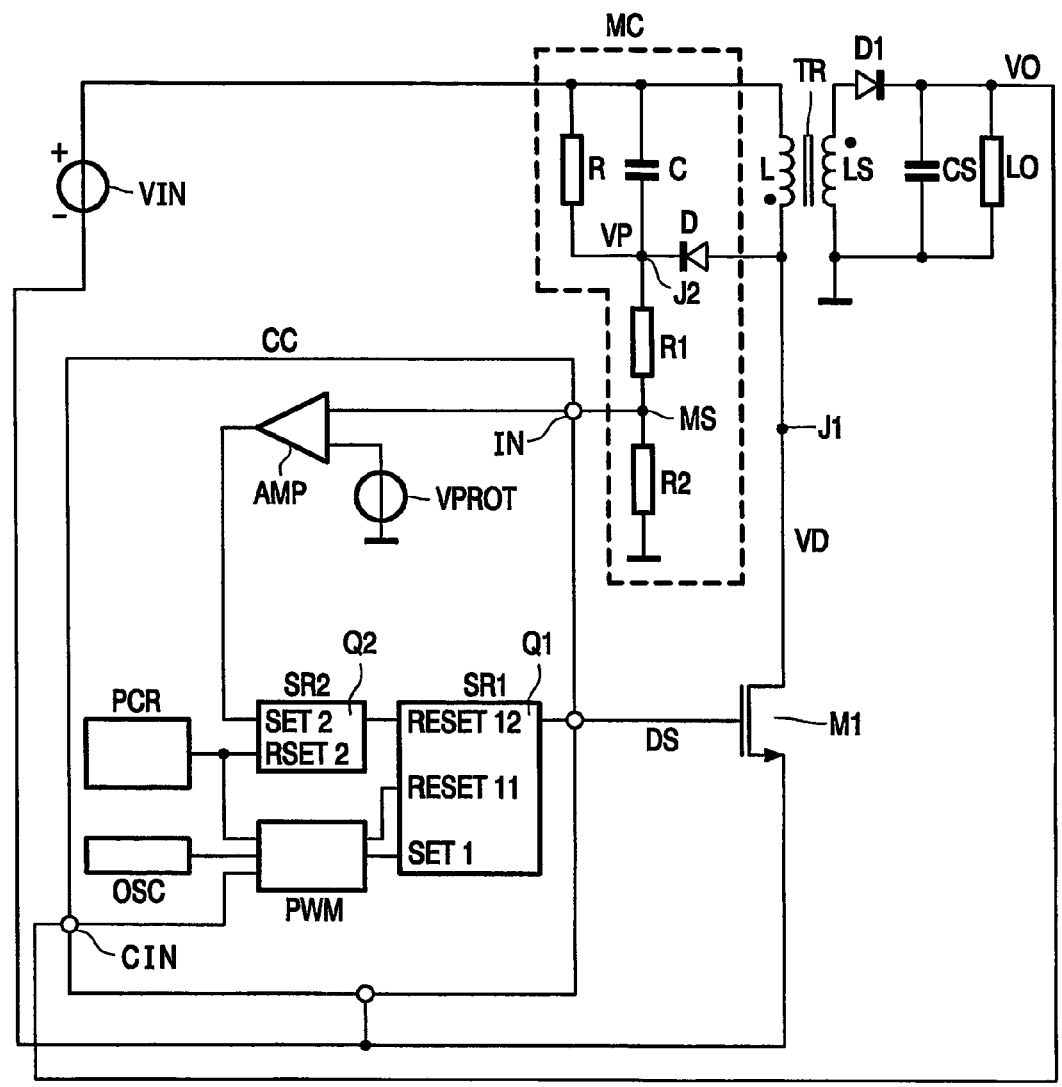

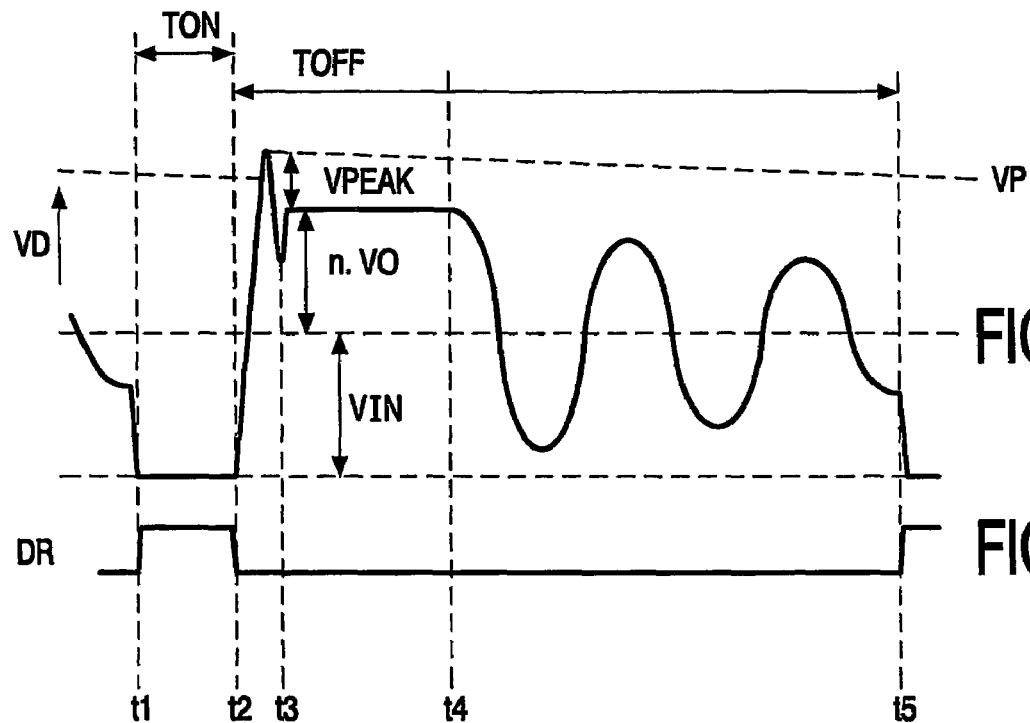
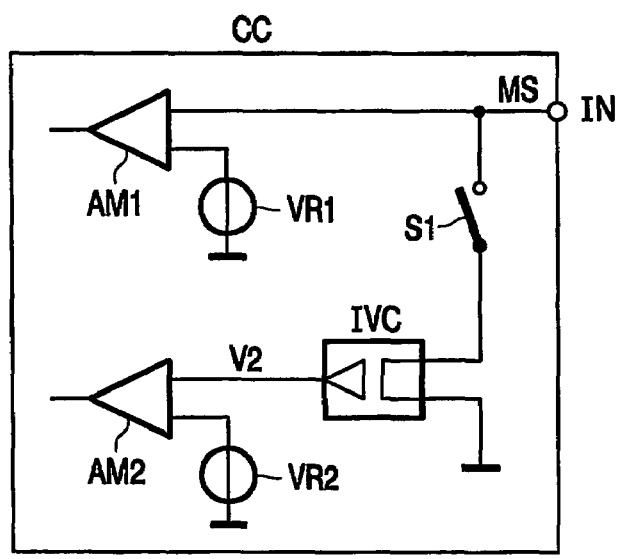

POWER CONVERTER

The invention relates to a power converter, an apparatus comprising such a power converter, and a control circuit for use in such a power converter.

U.S. Pat. No. 5,103,386 discloses a flyback converter in which an over-voltage on the main switch (the FET) is prevented by a peak-clamp. The peak-clamp comprises a capacitor and a diode. The cathode of the diode is connected to the DC-input voltage, and the anode of the diode is connected to the capacitor. The other end of the capacitor is connected to the junction of a primary winding of the transformer and the FET. The peak-clamp will suppress high voltage peaks on the drain of the FET: the diode will become conductive as soon as the voltage at the junction of the diode and the capacitor becomes higher than the DC-input voltage.

The flyback converter comprises a controller with an input which receives feedback information via an auxiliary winding of the transformer to stabilize the output voltage. This feedback is optimized to stabilize the flyback converter, and not to protect the flyback converter if the output voltage rises steeply due to a fault. No protection against overvoltage at the FET is present when this feedback loop is broken and the output voltages rise to too high a value.

Further, the voltage across the capacitor of the peak-clamp is coupled to the input of the controller via a demagnetization network. The demagnetization network uses the voltage across the capacitor to generate a current which decreases the voltage at the input of the controller to prolong the on-time of the main switch. Thus, the demagnetization network does not protect against over-voltage.

Further, the known power converter has no protection against too high an input voltage.

It is an object of the invention to provide a power converter with an improved protection against over-voltage across the main switch.

A first aspect of the invention provides a power converter as claimed in claim 1. A second aspect of the invention provides an audio and/or visual apparatus comprising such a power converter as claimed in claim 9. A third aspect comprises a controller for use in such a power converter as claimed in claim 11. Advantageous embodiments are defined in the dependent claims.

In accordance with the first aspect of the invention, the power converter comprises an inductor (which may be a coil or a primary winding of a transformer) and a main switch (which may be any controllable electronic switch, such as for example a FET or a bipolar transistor). The inductor and a main current path of the main switch are arranged in series to receive a DC-input voltage.

A control circuit controls on and off-periods of the main switch. During the on-periods, the current through the inductor increases and energy is stored in the inductor. During the off-period, the or part of the energy stored in the inductor is transferred to the load. Usually, the control circuit comprises a feedback input at which the output voltage across the load is fed back to stabilize the output voltage.

The power converter further comprises a measuring circuit coupled to a junction of the inductor and the main switch to supply a measuring signal which is indicative of a voltage across the main switch.

The control circuit has a protection input coupled to the measuring circuit to receive the measuring signal for influencing the on and off-periods of the main switch to protect the main switch against overvoltage.

The separate measurement of the voltage at the junction of the inductor and the main switch enables to better process any overvoltage detected. And thus, it also provides a safety measure against an interrupted feedback or too high a value of the DC-input voltage. The separate detection of the overvoltage allows to take adequate action, such as switching off the power converter temporarily or until a power-on reset is received. It is also possible to decrease the duration of the on-period or to increase the duration of the off-period.

In an embodiment as defined in claim 2, the measuring circuit comprises a series arrangement of a diode and a capacitor. The series arrangement is arranged across the inductor. The control circuit has an input which is coupled to the junction of the series arrangement of the diode and the capacitor to receive a signal indicating the voltage across the main switch. This series arrangement of the capacitor and the diode may be dimensioned to actually perform the peak-limiter function. Or conversely, the already present peak limiter components may be used as the measuring circuit. It is also possible to dimension the capacitor and diode such that only the measurement of the voltage is relevant. Now, these components need not be able to withstand the high currents flowing in a peak limiter.

Although it is possible to measure the voltage at the junction of the main switch and the inductor (thus at the drain if the main switch is a FET) directly, the measurement via the diode and the capacitor has many advantages.

Measuring the drain voltage with a resistive divider turned out to be very difficult. Firstly, the protection circuit has to be very fast as it has to track the peak voltage at the start of the off-period with a high accuracy. The high accuracy is important because it should be possible to use the switching devices up to full specification. Less accuracy would lead to over-rated devices which are more expensive. Secondly, the voltage over the resistive divider deviates from the calculated value due to parasitic capacitance to ground and across the resistors of the divider. To make these parasitic capacitances insignificant, the resistive divider should be low-ohmic which has the drawback of increasing dissipation. The measurement with the series arrangement of the diode and the capacitor has none of these disadvantages.

In an embodiment as defined in claim 3, the series arrangement of the diode and the capacitor is arranged across the inductor so that the free end of the diode is connected to the junction of the inductor and the main switch. The free end of the capacitor is connected to the other end of the inductor which is coupled to receive the DC-input voltage. The diode is poled such that it conducts during the off-period of the main switch when the voltage at the junction of the main switch and the inductor is sufficiently high. The controller is coupled to the junction of the capacitor and the diode.

This arrangement has the advantage that any change in the DC-input voltage will be supplied to the control circuit directly via the capacitor.

In an embodiment as defined in claim 4, the resistor which is coupled across the capacitor provides a DC-path between the DC-input voltage and the input of the controller. This has the advantage that the controller is able to measure the value of the DC-input voltage directly. The controller may take action to protect the main switch if it is detected that the DC-input voltage is too high. In this embodiment in accordance with the invention, the measuring circuit provides information on an overvoltage on the DC-input voltage, an overvoltage on the output voltage, and an overvoltage due to resonance when the main switch is turned off. Consequently, the main switch can be used up to its maximum specifications. Any possible overvoltage will be detected by the measuring circuit and the controller will take whatever action required to avoid the overvoltage at the main switch.

In an embodiment as defined in claim 5, the resistor divider converts the voltage on the junction of the diode and the capacitor to an input voltage on the input of the controller with a much lower value. This is particularly important when the controller is an integrated circuit which is not able to withstand high voltages.

In an embodiment as defined in claim 6, the controller comprises a series arrangement of a further switch and a current-to-voltage converter. The series arrangement is coupled between the input of the controller and a reference potential. A first comparator compares a voltage at the input of the controller with a first reference voltage when the further switch is open. A second comparator compares a voltage at an output of the current-to-voltage converter with a second reference voltage when the further switch is closed.

This arrangement allows to provide two protection levels. If the further switch is closed, the current through the first resistor is measured and compared with the second reference level. If this current is larger than the second reference level, a first protection can be activated. When the further switch is open, the voltage measured at the input of the controller is compared with the first reference level. A second protection is activated when the voltage at the input crosses the first reference level. Thus, the first protection level can be set with the value of the first resistor, while the second protection level can be set by the ratio of the values of the first and the second resistor.

These two protection levels make it possible to take different actions depending on which protection level is surpassed. If a small overvoltage is detected when the lower of the two protection levels is surpassed, the controller may influence the duration of the on and/or off period to lower the voltage across the main switch. If both protection levels are surpassed, the controller may take more rigorous action such as tuning off the main switch and keeping the main switch off until it is detected that there is no longer overvoltage. Or to wait until a power-on reset is received. The lowest protection level may also be used to detect that the voltage is low enough to allow a restart of the power converter.

These and other aspects of the invention are apparent from and will be elucidated with reference to the embodiments described hereinafter.

In the drawings:

FIG. 1 shows a diagram of a flyback converter in accordance with an embodiment of the invention, FIGS. 2A and 2B show waveforms for elucidating the operation of the flyback converter of FIG. 1, and FIG. 3 shows an embodiment of the control circuit of the flyback converter.

The same references in different Figs. refer to the same signals or to the same elements performing the same function.

FIG. 1 shows a diagram of a flyback converter in accordance with an embodiment of the invention. The flyback converter comprises a series arrangement of an inductor L and a main current path of a main switch M1. In this embodiment in accordance with the invention, the inductor L is a primary winding of a transformer TR. The series arrangement is coupled to a DC-input voltage source to receive an input voltage VIN. The DC-input voltage source may be a rectifier which supplies a rectified mains voltage. A secondary winding LS of the transformer TR supplies current to a parallel arrangement of a smoothing capacitor CS and a load LO via a rectifier D1.

A control circuit CC has a control input CIN which is coupled to the output voltage VO, and a protection input IN which is coupled to an output of a measuring circuit MC. The measuring circuit MC is coupled to the junction J1 of the inductor L and the main current path of the main switch M1. The control circuit CC has an output which is coupled to a control input of the main switch M1 to control the on and off-periods of the main switch M1.

In the embodiment of the measuring circuit MC shown, a series arrangement of a diode D and a capacitor C is coupled across the inductor L. The anode of the diode D is coupled to the junction J1. A resistor R is coupled in parallel with the capacitor C. A series arrangement of a resistor R1 and a resistor R2 is coupled between ground and a junction J2 of the diode D and the capacitor C. A voltage at the junction J2 is denoted by VP. The junction of the resistors R1 and R2 is coupled to the protection input IN of the control circuit CC to supply the measuring signal MS.

The control circuit CC comprises an oscillator OSC for generating timing signals to be used in the control circuit CC. The pulse width controller PWM receives the feedback voltage at the control input CIN to control the duty cycle of the drive signal DS supplied at the output of the control circuit CC via the set-reset flip-flop SR1. The set-reset flip-flop SR1 has a set input SET1 and a first reset input RSET11 both coupled to the pulse width controller PWM, a second reset input RSET12, and an output Q1 which supplies the drive signal DS. A set-reset flip-flop SR2 comprises a set input SET2, a reset input RSET2, and an output Q2 which is connected to the reset input RSET12. A power-on-reset circuit POR supplies a reset signal to the reset input RSET2 and to the pulse width controller PWM. An amplifier or comparator AMP has an input connected to the input IN of the controller CC, a further input connected to a reference voltage VPROT, and an output coupled to the set input SET2.

The operation of the flyback converter shown in FIG. 1 will be elucidated with respect to the signal waveforms shown in FIG. 2.

FIGS. 2A and 2B show waveforms for elucidating the operation of the flyback converter of FIG. 1. FIG. 2A shows the drive voltage DR. FIG. 2B shows the voltage VD at the junction J1 and the voltage VP at the junction J2 of the diode D and the capacitor C.

At the instant t1, the pulse width controller PWM sets the set-reset flip-flop SR1 and the drive signal DR becomes high. The main switch M1 becomes conductive and the voltage VD becomes low. Usually, the instant t1 is determined by the pulse width controller PWM by counting a fixed number (which usually is one) of clock pulses generated by the oscillator OSC.

In normal operation, the set-reset flip-flop SR1 will be reset at the instant t2 via the RSET11 input by the pulse width controller PWM. The pulse width controller PWM controls a duty cycle of the drive signal DR such that the output voltage VO is stabilized at a varying load LO. The control of the duty cycle may be obtained in a well know manner by using the value of the output voltage VO directly. Alternatively, it is also well known to control the duty cycle in response to the current through the main switch M1. The set-reset flip-flop SR1 will be reset when the current through the main switch M1 crosses a reference level which is dependent on the output voltage VO.

Now, the main switch M1 becomes non-conductive and the voltage VD rises steeply. After an initial overshoot with a value of VPEAK during the period lasting from the instant t2 to t3, during the period t3 to t4, the diode D1 is conductive and the voltage VD stabilizes on the value VIN+n*VO, wherein n is the ratio between the number of turns of the primary winding L and the number of turns of the secondary winding LS. At the instant t4, the diode D1 stops conducting and the voltage VD shows a ringing which lasts until a next cycle starts at instant t5 when the drive signal DR causes the main switch M1 to conduct again. The period from instant t1 to t2 is referred to as the on-period of the main switch M1, and the period from instant t2 to t5 is referred to as the off-period of the main switch M1.

The set-reset flip-flop SR2 will be reset by the power-on-reset circuit POR, and will be set when the voltage at the protection input IN crosses the reference level VPROT. The set of the set-reset flip-flop SR2 will reset the set-reset flip-flop SR1 via the RSET12 input. Consequently, in this embodiment of the flyback converter in accordance with the invention, the main switch M1 is switched off whenever an overvoltage is detected. The flyback converter will resume normal operation only after a power-on-reset is generated and the set-reset flip-flop SR2 is reset. It is also possible to restart the flyback converter after a fixed time delay, or when the voltage across the switch M1 decreases to a lower level (the second protection level, if two protection levels are available as elucidated with respect to FIG. 3) than the level which triggered the protection (the first protection level).

The operation of the embodiment of the measuring circuit MC in accordance with the invention as shown in FIG. 1, depends on the resistance of the resistor R.

If the resistor R (and the resistors R1 and R2) has a high resistance, the diode D and the capacitor C will act as a peak detector, and the voltage VP will substantially be equal to the maximum value of the voltage VD at the junction J1 as shown in FIG. 2B. The over-voltage protection which uses this voltage VP will react on the sum of the DC-input voltage VIN, the output voltage n*VO as transformed to the primary winding L, and the peak voltage VPEAK. Thus, the controller CC acts also if the output voltage VO or the input voltage VIN becomes too high.

If the resistance of the resistor R is relatively low, the capacitor C will be discharged faster. Still, it is possible to measure the maximum value of the voltage VP during the period in time lasting from the instant t2 to t3. Further, during, or at the end of the period during which the diode D1 is conductive, the capacitor C may be discharged until the voltage VP reaches the value VIN+n*VO. During, or at the end of the on-period TON, the capacitor C may be discharged and the voltage VP may indicate the DC-input voltage VIN. Thus, at a relatively low resistance of the resistor R, the controller CC may at different instants receive input about different voltages in the flyback converter. This enables a smart way of handling situations of over-voltage. For example when too high a value of VIN is detected, the controller CC may not switch on the mains switch M1. Or, when too high a value of the voltage VP is detected in the period from the instant t2 to t3, the duty cycle of the drive signal DS is decreased. The flyback converter may be restarted when the DC-input voltage VIN reaches a sufficiently low value.

FIG. 3 shows an embodiment of the control circuit of the flyback converter.

The controller CC comprises a series arrangement of a switch S1 and a current-to-voltage converter IVC. The series arrangement is coupled between the input IN of the controller CC and a reference potential which is ground in FIG. 3. A first comparator AM1 compares the measuring signal MS at the input IN with a first reference voltage VR1 when the switch S1 is open. A second comparator AM2 compares a voltage V2 at an output of the current-to-voltage converter IVC with a second reference voltage VR2 when the switch S1 is closed. The outputs of the comparators AM1 and AM2 are used to control two different protective actions.

This arrangement enables to provide two protection levels. If the switch S1 is closed, the current through the first resistor R1 (see FIG. 1) is measured and compared with the second reference level VR2. If this current is larger than the second reference level VR2, a first protection is activated. When the switch S1 is open, the voltage VP measured via voltage divider formed by the resistors R1 and R2 (see FIG. 1) is present at the input IN of the controller CC and is compared with the first reference level VR1. A second protection is activated when the voltage at the input IN crosses the first reference level VR1. Thus, the first protection level can be set with the value of the first resistor, while the second protection level can be set by the ratio of the values of the first and the second resistor.

It should be noted that the above-mentioned embodiments illustrate rather than limit the invention, and that those skilled in the art will be able to design many alternative embodiments without departing from the scope of the appended claims.

For example, although the embodiments are directed towards a flyback converter, the present invention will reach the same advantages in other topologies of power converters.

In the claims, any reference signs placed between parentheses shall not be construed as limiting the claim. The word "comprising" does not exclude the presence of elements or steps other than those listed in a claim. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A power converter comprising: an inductor and a main switch having a main current path, the inductor sand the main current path being arranged in series for receiving a DC-input voltage, a measuring circuit coupled to a junction of the inductor and the main switch to obtain a measuring signal being indicative of a voltage across the main current path, and a control circuit for controlling on-periods and/or off-periods of the main switch to stabilize an output voltage supplied to a load, and having an input for receiving the measuring signal to protect the main switch against an overvoltage.

2. A power converter as claimed in claim 1, wherein the measuring circuit comprises a series arrangement of a diode and a capacitors, the series arrangement of the diode and the capacitor being coupled in parallel with the inductor, the input of the control circuit being coupled to a junction of the series arrangement of the diode and the capacitors.

3. A power converter as claimed in claim 2, wherein the diode is coupled to the junction of the main switch and the inductor, the diode being poled to be able to conduct during the off-period of the main switch.

4. A power converter as claimed in claim 3, wherein the measuring circuit comprises a resistor coupled across the capacitor.

5. A power converter as claimed in claim 2, wherein the measuring circuit comprises a resistor divider comprising a first resistor and a second resistor, the first resistor being coupled between the junction of the capacitor and the diode and the input of the control circuit, the second resistor being coupled between the input of the control circuit and a fixed potential.

6. A power converter as claimed in claim 5, wherein the control circuit comprises: a series arrangement of a further switch and a current-to-voltage converter, the series arrangement being coupled between the input and a reference potential, a first comparator for comparing a voltage at the input with a first reference voltage when the further switch is open, and a second comparator for comparing a voltage at an output of the current to voltage converter with a second reference potential when the further switch is closed.

7. A power converter as claimed in claim 1, wherein the control circuit comprises an comparator for comparing the measuring signal with a reference signal to halt the operation of the power converter when the measuring signal crosses the reference signal indicating that a voltage across the main switch is higher than a particular value.

8. A power converter as claimed in claim 1, wherein the diode and the capacitor are dimensioned to operate as a peak-limiter.

9. An apparatus comprising the power converter as claimed in claim 1.

10. An apparatus as claimed in claim 9, wherein the apparatus comprises a processing circuit for processing an input signal into an output signal to be made audible via a sound transducer and/or to be displayed on a display device and the power converter as claimed in claim 1, wherein the load comprises the processing circuit.

11. A control circuit for use in the power converter claim 1.

* * * * *